United States Patent Office 3,429,928
Patented Feb. 25, 1969

3,429,928
POLYENE COMPOUNDS AND PROCESSES
Joseph Donald Surmatis, West Caldwell, N.J., assignor to Hoffmann-La Roche Inc., Nutley, N.J., a corporation of New Jersey
No Drawing. Filed Mar. 28, 1966, Ser. No. 537,653
U.S. Cl. 260—586         9 Claims
Int. Cl. C07c 49/44; C07f 9/28

ABSTRACT OF THE DISCLOSURE

Hydroxenin is oxidized to 3,7-dimethyl-6-oxo-9-(2,6,6-trimethyl - 1 - cyclohexen - 1 - yl) - 2,4,7 - nonatrienal, which undergoes a Wittig condensation to produce the 3,7,12,16 - tetramethyl - 1,18 - bis(2,6,6 - trimethyl - 1-cyclohexen - 1 - yl)octadeca - 2,5,7,9,11,13,15,17 - octaene-4-one. This 4-one is then reduced to the corresponding 4-ol. The 4-ol is dehydrated to form a mixture of cis- and trans-β-carotene, which is isomerized to all trans-β-carotene.

---

The present invention relates to polyene compounds and processes for their preparation. More particularly, this invention relates to the preparation of carotenoid compounds from hydroxenin, an intermediate in the commercial synthesis of vitamin A.

An important and known commercial process for the preparation of vitamin A and esters thereof involves the intermediate hydroxenin (1,6 - dihydroxy - 3,7 - dimethyl - 9 - [2',6',6' - trimethylcyclohexen - 1' - yl] - nonatriene-2,4,7). In that process crystalline oxenin (1,6-dihydroxy - 3,7 dimethyl - 9 - [2',6',6' - trimethyl - 1 - cyclohexen - 1 - yl] - 2,7 - nonadiene - 4 - yne) is hydrogenated to hydroxenin. Hydroxenin is then acetylated and further reacted to form a vitamin A ester, e.g., vitamin A acetate, which can be saponified to vitamin A. See, for example, U.S. Patent 2,610,207 to Lindlar et al. and U.S. Patent 2,610,208 to Surmatis. Vitamin A ester can then be converted to a carotenoid in a known manner.

There has now been discovered a process by which the hydroxenin intermediate can be directly utilized as a starting material for the preparation of trans-β-carotene without first converting hydroxenin to vitamin A or an ester of vitamin A. The instant process is carried out by oxidizing hydroxenin with an oxidizing agent, e.g., manganese dioxide, potassium permanganate, potassium dichromate, preferably manganese dioxide, in solvents such as an aliphatic hydrocarbon, e.g., petroleum ether, hexane, heptane, etc., or a chlorinated hydrocarbon, e.g., chloroform, methylene chloride, ethylene dichloride, etc., preferably methylene chloride, to form a novel keto aldehyde, 3,7 - dimethyl - 6 - oxo - 9 - (2,6,6 - trimethyl - 1-cyclohexen-1-yl)-2,4,7-nonatrienal. The reaction is preferably conducted at room temperature, i.e., from about 20° to about 30° C., although temperature is not critical. The aforesaid resulting keto aldehyde can then be condensed with a compound of the formula

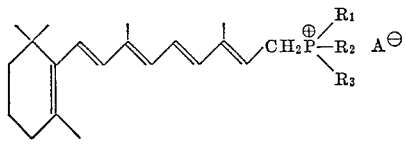

wherein $R_1$ and $R_2$ are each, individually, aryl or aralkyl and $R_3$ is aryl, aralkyl or alkyl, and A is an anion of a mineral acid, in the presence of a proton acceptor, e.g., a strong base, to form the novel keto carotenoid 3,7,12,16 - tetramethyl - 1,18 - bis(2,6,6 - trimethyl - 1 - cyclohexen - 1 - yl)octadeca - 2,5,7,9,11,13,15,17 - octaene - 4-one. The term "aryl" as employed in this application is intended to embrace all commonly known aryl groups including, for example, phenyl, substituted phenyl, e.g., tolyl, xylyl, mesityl, polynuclear condensed ring groups, e.g., naphthyl, anthryl, phenanthryl, azulyl, etc. Similarly, the term "aralkyl" encompasses all commonly known aralkyl groups, including tribenzyl for example. In those phosphines wherein an alkyl group is present, i.e., wherein $R_3$ is alkyl, a long chain alkyl group, e.g., octyl, decyl, lauryl or palmityl is preferred. The mineral acids which can be employed include organic acids such as sulfuric acid or hydrohalic acids, especially hydrochloric acid or hydrobromic acid. Sulfuric acid is preferred. In addition, all acids which form acid addition salts with phosphines (e.g., strong organic acids such as benzenesulfonic acid) can also be employed. Since the phosphonium acid salt is not present in the final carotenoid, nonpharmaceutically acceptable strong acids can be employed as well as pharmaceutically acceptable acids, although the latter are preferred. The proton acceptors employed are preferably basic agents, e.g., strong bases such as alkali metal hydroxides, alkaline-earth metal hydroxides, alkali metal amides, alkaline-earth metal amides, alkali metal alcoholates, alkaline-earth metal alcoholates, ammonia, strongly basic amines, metallo-organic compounds, particularly Group I metallo-alkyl and Group I metallo aryl compounds, such as lithium methyl, lithium phenyl, sodium phenyl, sodium methyl, Grignard compounds, e.g., alkyl and aryl magnesium halides, etc. Potassium hydroxide and sodium hydroxide are preferred although sodium amide has been found quite effective.

The temperature has not been found to be critical in the aforesaid reaction although operating conditions of 0° C. to +20° C. are preferred. Although any inert solvent can be employed in the condensation of the aforesaid keto aldehyde with the phosphonium salt of Formula I to prepare the corresponding keto carotenoid, the preferred solvents are methanol, tetrahydrofuran, pyridine, dimethylsulfoxide, and isopropyl and ethyl ether, although any inert solvent can be employed.

The phosphonium salt reactant of Formula I can be prepared by treating vitamin A with a phosphine of the formula

wherein $R_1$, $R_2$ and $R_3$ are as defined above and a mineral acid, e.g., sulfuric acid, or the hydrohalic acids, such as hydrochloric and hydrobromic acid, preferably in the presence of an inert solvent, such as a lower alkanol solvent, e.g., methanol.

The keto carotenoid 3,7,12,16-tetramethyl-1,18-bis(2, 6,6-trimethyl-1-cyclohexen-1 - yl)octadeca - 2,5,7,9,11,13, 15,17-octaene-4-one can be treated with a reducing agent to form the corresponding hydroxy carotenoid 3,7,12,16-tetramethyl - 1,18-bis(2,6,6-trimethyl-1-cyclohexen-1-yl)-octadeca-2,5,7,9,11,13,15,17-octaene-4-ol. The preferred reducing agents are metal hydrides, e.g., sodium borohydride, lithium aluminum hydride or diisobutyl aluminum hydride, although any known keto reducing agent effective in the presence of double bonds can be used. The aforesaid reduction is carried out in the presence of a solvent inert to the reducing agent but in which the product is soluble. When sodium borohydride is used the preferred solvents are lower alcohol-pyridine solvents, e.g., methanol-pyridine, although most alcohols in an organic base will be suitable. A lower alkanol can be used as the sole solvent, but when doing so, it is preferred to employ an excess of the metal hydride reducing agent. However, other inert solvents such as ethyl ether, benzene, toluene or the aliphatic hydrocarbons are preferred to the use of alcohol alone when using a metal hydride reducing agent, e.g., lithium aluminum hydride or di-isobutyl aluminum hydride. Other known keto reducing agents include aluminum isopropoxide in isopropyl alcohol.

Temperature is not a significant factor, but when employing aluminum isopropoxide in isopropyl alcohol as the reducing agent, it is desirable to carry out the reduction at reflux temperature.

The hydroxy carotenoid 3,7,12,16-tetramethyl-1,18-bis (2,6,6-trimethyl-1-cyclohexen-1-yl) - 2,5,7,9,11,13,15,17 - octadecaoctaen-4-ol can optionally be converted into a novel monoretro carotene product 1-(2,6,6-trimethylcyclohex-2-enylidene) - 18 - (2,6,6-trimethyl-cyclohexen-1-yl) - 3,7,12,16 - tetramethyl - octadeca - 2,4,6,8,10,12,14,16-octaene or can directly be converted into trans-$\beta$-carotene. The novel mono-retro carotene product can be obtained by mild dehydration of the aforesaid hydroxy carotenoid. Mild dehydration can be accomplished by the addition of a weak acid, by operation at very low temperatures or, most effectively, by a combination of the two. For example, the slow addition of a conventional dehydrating agent in an inert solvent, e.g., dropwise for a period of approximately one hour, at temperatures from about $-20°$ C. to about $+10°$ C., preferably approximating $0°$ C., will yield a precipitate. By halting the reaction on the formation of the precipitate, e.g., removing the precipitate from the reaction medium as it forms, washing said precipitate and recrystallizing it in a conventional manner, a pure mono-retro carotene can be obtained. It is preferred to conduct the dehydration with a conventional dehydrating agent such as hydrohalic acid, e.g., hydrobromic acid or hydrochloric acid, in an inert solvent such as a lower ketone, e.g., acetone, or a lower alkanol, e.g., isopropyl alcohol. The crude mono-retro carotene which first precipitates from the dehydration reaction can be purified by conventional recrystallization, for example, from an aliphatic hydrocarbon solvent, e.g., heptane.

The mono-retro carotene product thus obtained is useful as a colorant per se and can be used as an intermediate for the preparation of other commercially useful carotenoids. For example, the mono-retro carotene product can be used for the preparation of canthaxanthin and trans-$\beta$-carotene. The latter can be prepared by isomerizing mono-retrocarotene. The isomerization itself can be conducted by the addition of catalytic quantities of a mineral acid, e.g., $H_2SO_4$, HBr, HCl, at a temperature of from about $20°$ C. to about $50°$ C. in the presence of an inert solvent such as a ketone, e.g., acetone, an alkanol, e.g., methanol, tetrahydrofuran, dimethylsulfoxide, dimethylformamide, etc.

As indicated above, the hydroxy carotenoid, in lieu of being converted into the novel mono-retro carotene product, can be directly converted into $\beta$-carotene. For example, the rapid addition of a conventional dehydrating agent in an inert solvent, as described above, at higher temperatures, i.e., from about $+15°$ C. to about $+50°$ C., preferably approximating $25-30°$ C., with vigorous stirring, results in the direct conversion of the hydroxy carotenoid to crude $\beta$-carotene. The crude $\beta$-carotene can be isomerized to trans-$\beta$-carotene and purified by recrystallization in a conventional manner such as described above.

The following examples will serve to illustrate the invention but are not limitative or restrictive thereof.

EXAMPLE 1

The oxidation of hydroxenin to form $C_{20}$ keto aldehyde

Hydroxenin (608 g.) was placed in a 12 liter flask with 4,800 ml. of methylene chloride and 2.4 kg. of manganese dioxide. The reaction was stirred for 24 hours under an atmosphere of nitrogen. An additional 2.4 kg. of manganese dioxide was added, and the stirring was continued for 24 hours longer. The spent manganese dioxide was filtered, and it was washed with additional methylene chloride. The solvent was removed under vacuum to yield 613 g. of crude product with an $E_{1cm.}^{1\%}$ value of 710 at 289–290 m$\mu$ (in ethyl alcohol)

A pure sample was prepared by crystallization from petroleum ether. This melted at $74°$ and had an $E_{1cm.}^{1\%}$ value of 1,014 at 290 m$\mu$ (in ethyl-alcohol)

EXAMPLE 2

The preparation of crystalline vitamin A Wittig compound

Triphenylphosphine (528 g.) and methyl alcohol (3,000 ml.) were placed in a 5 liter flask. Concentrated sulfuric acid (104 ml.) was added to the stirred mixture from a dropping funnel in 30 minutes; then stirring was continued at room temperature for 2 hours. Crystalline vitamin A acetate (584 g.) was added all at once, and the reaction was stirred under an atmosphere of nitrogen for 24 hours.

The methyl alcohol solvent was removed by distillation under vacuum without allowing the residue to heat above $50°$ C. The oily residue was warmed with 3,200 ml. of acetone while stirring; then the solution was cooled in a refrigerator for 12 hours at $10°$ C. The Wittig salt of vitamin A which crystallized was washed with additional acetone ($20°$ C.) and dried under vacuum. There resulted 680 g. of product melting at $201°$ C.

EXAMPLE 3

Preparation of keto carotene from pure starting materials

Sixty-four grams of the crystalline Wittig salt described by Example 2 was dissolved in 1,200 ml. of methyl alcohol. To this there was added 30 g. of the crystalline keto aldehyde described by Example 1. The solution was cooled to $+10°$, and a solution of 5 g. of potassium hydroxide dissolved in 100 ml. of methyl alcohol was dropped in while stirring under nitrogen in 30 minutes. The cold bath was removed, and the reaction was stirred under an atmosphere of nitrogen overnight. On the following day, the product, which consisted of a brilliant orange colored solid, was filtered and dried under vacuum at $50°$ C. The yield of crude product was 56 g. On recrystallization from benzene and methyl alcohol, there was obtained 45 g. of the pure keto carotenoid, M.P. $156°$;

$E_{1cm.}^{1\%} = 1682$ at 438 m$\mu$ (in cyclohexane)

EXAMPLE 4

Preparation of the keto carotenoid from crystallization mother liquor vitamin A acetate (a) *Saponification of the crude acetate.*—Crude vitamin A acetate recovered from crystallization mother liquors as the noncrystallizable residue, and consisting of a mixture of cis and trans isomers with an assay of $1.0 \times 10^6$ units/gram (USP XVI MS) 1332 g., was dissolved in 6 liters of methyl alcohol. To this were added 420 ml. of a 50 aqueous solution of sodium hydroxide and 50 ml. of a benzene solution containing 2.5 g. each of BHA and BHT. The reaction was stirred under an atmosphere of nitrogen for 1 hour and then diluted with an equal volume of water. Solid carbon dioxide was added until the pH of 7.5 was reached. The solution was extracted with $3 \times 2,000$ ml. of petroleum ether. The combined extracts were water washed and concentrated to a syrup under vacuum at 40–45° C. The residue weighed 1,157 g. with $n_D^{25}$ 1.6090.

(b) *The preparation of crude Wittig.*—In a 12 liter flask, there were placed 2,000 ml. of methyl alcohol, 370 g. of triphenylphosphine and 75 ml. of concentrated sulfuric acid. This was stirred for 1 hour. The crude syrup described by (a) was dissolved in 1 liter of methyl alcohol and added to the reaction flasks. This was stirred under an atmosphere of nitrogen for 24 hours.

(c) *The condensation.*—Six hundred and twelve grams of crude keto aldehyde which was prepared by a procedure as described in Example 1 was dissolved in 1,000 ml. of methyl alcohol to which 10 ml. of pyridine was added.

One hundred and twenty grams of potassium hydroxide was dissolved in 1,000 ml. of methyl alcohol.

The potassium hydroxide solution and the crude keto aldehyde solution were added to the crude Wittig described under (b) from separate dropping funnels in 1 hour. The temperature during the addition was kept at 10 to 15° C. The reaction was then stirred overnight at 15 to 20° C. and filtered. There was obtained 678 g. of crude dry product with $$E_{1\,cm.}^{1\%} = 911 \text{ at } 438 \text{ m}\mu$$

On recrystallization from heptane, pure material with M.P. 156° and $$E_{1\,cm.}^{1\%} = 1682$$

was obtained.

EXAMPLE 5

The reduction of keto caroten to form hydroxy carotene

A solution of 600 ml. of methyl alcohol and 600 ml. of pyridine was cooled to +5° C. To this there were added 15 g. of sodium borohydride and 60 g. of keto carotene. The reaction was stirred under an atmosphere of nitrogen for 24 hours. The temperature was allowed to warm up to room temperature (25°) after 2 hours of stirring. At the end of the reaction period, a test by TLC on a silica gel plate (20% acetone-80% heptane) showed that the reaction was completed.

The contents of the reaction flask were poured into 2 liters of ice water in a separator provided with a stirrer, and the product was extracted out with 2×1,000 ml. of methylene chloride. This was washed with 4×2,000 ml. of water and concentrated to a syrup under vacuum. The product was obtained (64.6 g.) as an orange colored resinous solid with $$E_{1\,cm.}^{1\%} = 1613 \text{ at } 405 \text{ m}\mu$$

EXAMPLE 6

Conversion of hydroxy carotene to mono-retro carotene

To a solution of hydroxy carotene (316 g.) in acetone (300 ml.), a solution of 63% hydrobromic acid (100 ml. 63% HBr in 500 ml. acetone) was added at 0° C. The addition was made drop by drop over a period of one hour. The solid was filtered and washed with water and then with acetone. The crude mono-retro carotene weighed 251 g., M.P. 154–159°, $$E_{1\,cm.}^{1\%} = 2600 \text{ at } 445 \text{ m}\mu$$

On recrystallization from benzene-methanol, the pure mono-retro carotene compound melted at 168–169°;

$$E_{1\,cm.}^{1\%} = 2936 \text{ at } 444 \text{ m}\mu$$

The structure was confirmed by nuclear magnetic resonance spectra.

EXAMPLE 7

Conversion of hydroxy carotene to carotene

To a solution of the hydroxy carotene (82.2 g.) (see Example 5) in acetone (800 ml.), a solution of 63% hydrobromic acid (20 ml. in 150 ml. acetone) was added at 0° C. with vigorous stirring. The reaction temperature was allowed to rise to room temperature while stirring was continued for 5 hours under an atmosphere of nitrogen. The red crystalline solid was filtered, washed with water and then with acetone, and dried under vacuum. The crude carotene melted at 175–178° with $$E_{1\,cm.}^{1\%} = 2339 \text{ at } 454 \text{ m}\mu$$

On recrystallization from heptane, pure trans-β-carotene was obtained with a M.P. of 181° and $$E_{1\,cm.}^{1\%} = 2450 \text{ at } 454 \text{ m}\mu$$

EXAMPLE 8

Preparation of trans-β-carotene from mono-retro carotene

Mono-retro carotene (25 g.) was suspended in 250 ml. of acetone. A solution of 63% hydrobromic acid (1.0 ml. in 50 ml. of acetone) was added dropwise in 30 minutes and the reaction was stirred for 3 hours at room temperature under an atmosphere of nitrogen. The red crystalline solid was filtered and washed first with water and then with acetone. There was obtained 24 g. of almost pure trans-β-carotene, M.P. 179–180°, $$E_{1\,cm.}^{1\%} = 2430 \text{ at } 454 \text{ m}\mu \text{ (in cyclohexane)}$$

The identity of the compound was verified by mixed melting point and nuclear magnetic resonance spectra.

EXAMPLE 9

Preparation of trans-β-carotene from hydroxy carotene

Ten grams of the hydroxy carotene described by Example 5 was dissolved in 50 ml. of ethyl ether and 10 ml. of isopropyl alcohol. Ten ml. of a 6 N solution of hydrogen chloride in isopropyl alcohol was added, and the solution was stirred under an atmosphere of nitrogen for 3 hours. On filtration, trans-β-carotene was obtained as a red crystalline solid, M.P. 174–176° C. On recrystallization from benzene-methanol, pure trans-β-carotene resulted, M.P. 181°, $$E_{1\,cm.}^{1\%} = 2450 \text{ at } 453-454 \text{ m}\mu \text{ (in cyclohexane)}$$

I claim:

1. A process for the preparation of keto-β-carotene comprising the steps of
   (a) reacting hydroxenin with manganese dioxide in methylene chloride; and
   (b) reacting the resulting product with a compound of the formula

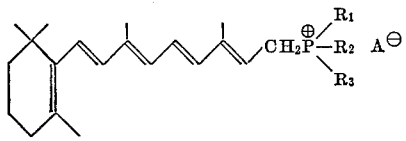

wherein $R_1$ and $R_2$ are each, individually, aryl or aralkyl and $R_3$ is aryl, aralkyl and alkyl and A is an anion of a mineral acid, in the presence of a strong base to form the keto carotenoid.

2. A process according to claim 1 wherein the keto carotenoid product is reacted with a metal hydride reducing agent in an inert solvent to form the corresponding hydroxy carotenoid.

3. A process according to claim 2 where in a subsequent step the hydroxy carotenoid product is reacted with a hydrohalic acid dehydrating agent in an inert solvent at a temperature of from about −20° C. to about 10° C.

4. A process according to claim 3 wherein the dehydrating agent is a solution of hydrogen chloride in isopropyl alcohol.

5. A process according to claim 3 wherein the dehydrating agent is a solution of hydrobromic acid in acetone.

6. A process according to claim 3 wherein the reaction with the dehydrating agent is carried out at a temperature of from about +15° C. to about +50° C. with vigorous stirring to form a mixture of cis- and trans-β-carotene.

7. 3,7-dimethyl-6-oxo-9-(2,6,6-trimethyl-1-cyclohexen-1-yl)-2,4,7-nonatrienal.

8. 3,7,12,16 - tetramethyl - 1,18-bis(2,6,6-trimethyl-1-cyclohexen - 1 - yl)octadeca - 2,5,7,9,11,13,15,17-octaene-4-one.

9. 3,7,12,16 - tetramethyl - 1,18-bis(2,6,6-trimethyl-1-cyclohexen - 1 - yl)-octadeca-2,5,7,9,11,13,15,17-octaene-4-ol.

References Cited

Raphael: "Adv. in Org. Chem.," pp. 152, 178, 182 to 184, 192 to 194 and 198 (1963).

Isler et al.: "Helv. Ch. Acta," vol. 39 p. 456 (1956).

LEON ZITVER, Primary Examiner.

M. JACOB, Assistant Examiner.

U.S. Cl. X.R.

260—606.5, 617, 666